Patented June 13, 1950

2,510,981

UNITED STATES PATENT OFFICE 2,510,981

CYANOMELAMINES AND THE PREPARATION THEREOF

Donald W. Kaiser, Riverside, and Bryan C. Redmon, Stamford, Conn., assignors to American Cyanamid Company, New York, N. Y., a corporation of Maine No Drawing. Application September 26, 1946, Serial No. 699,584

15 Claims. (Cl. 260—249.5)

The present invention relates to cyanomelamine and metal salts thereof, and to a method for their preparation.

It is an object of the present invention to prepare cyanomelamine and metal salts thereof in high yields by a method which employs cheap reactants and requires only simple apparatus and procedures.

Other objects will be made apparent from the discussion hereinafter.

It has now been discovered that cyanomelamine and metal salts thereof having the formula

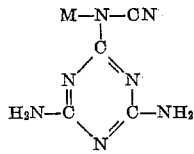

where M may be hydrogen or alkali metal or alkaline earth metal ion, may be prepared by reacting a dicyanimide with a dicyandiamide under strongly basic conditions. The compounds of this formula are referred to hereinafter and in the claims as a "cyanomelamine." The terms "a dicyanimide" and "a dicyandiamide" as used here and in the claims are meant to include, in addition to dicyanimide and dicyandiamide, the alkali metal and alkaline earth metal salts thereof.

The strongly basic conditions required for carrying out the reaction of the present invention are provided by employing an excess of an alkali metal or alkaline earth metal base such as the oxides, hydroxides, alkoxides, and dicyandiamides. Dicyandiamide being only weakly acidic, its alkali metal and alkaline earth metal salts readily dissociate to provide the free dicyandiamide and the alkali metal or alkaline earth metal hydroxide or alkoxide, so that its use is substantially equivalent to employing such other bases. Although dicyanimide may be prepared as such, its preparation and handling are difficult from the standpoint of isolation and storage and accordingly it is usually employed in the form of its salts in which form it is obtained by treating a cyanamide salt with cyanogen chloride. Generally, using an alkali metal or alkaline earth metal dicyanimide it is only necessary to employ a small excess of one of the aforementioned bases in order to provide the basic conditions required for carrying out the reaction. However, if the free dicyanimide is employed it is first necessary to completely neutralize this strongly acidic material and then add the additional base to provide the required strongly basic conditions. Using 1 equivalent of a dicyanimide it is preferred to employ a slight excess, i. e., slightly more than 1 equivalent, of dicyandiamide and about $\tfrac{1}{10}$ of an equivalent of an alkali metal or alkaline earth metal oxide, hydroxide, alkoxide, or dicyandiamide salt. When employing the calcium dicyanimide it is preferred to maintain anhydrous conditions and employ alkali metals or alkaline earth metals or the alkoxides thereof for the additional basicity that may be required since the use of hydroxide would permit the formation of the relatively insoluble calcium hydroxide. In the claims the term "strongly alkaline conditions" is meant to describe those provided by the use of excess alkali metal and alkaline earth metal oxides, hydroxides, and alkoxides and salts of dicyandiamide over and above any of such base which may be required to neutralize the dicyanimide.

The reaction is best carried out in solvents such as water, ethanol, methanol, propanol, isopropanol, butanol, glycerol, ethylene glycol, diethylene glycol, the mono ethers of ethylene glycol, the mono ethers of diethylene glycol, and the like. Such solvents are referred to hereinafter and in the claims as "water-miscible, hydroxylated solvents" and are preferred because of their general ability for dissolving the basic catalysts and the dicyanimides and dicyandiamides employed in the reaction. Particular advantage is provided in the use of the hydroxylated solvents in that they not only serve in solubilizing the reactants and catalysts but also in that the cyanomelamine and the alkali metal and alkaline earth metal salts of cyanomelamine are only very slightly soluble in these solvents even at elevated temperatures so that they precipitate as they are formed thus facilitating their separation and helping to carry the reaction to completion. Also, the alkali metal salts of cyanomelamine may be dissolved in these solvents at elevated temperatures provided large volumes of such solvents are employed, the cyanomelamine precipitating almost quantitatively on acidification, thus providing a means for purification of the cyanomelamine.

The selection of the base and/or the solvent to be employed is largely determined by the solubility of the different salts and bases in the particular hydroxylated solvent or solvent combination. In this connection, the alkali metal compounds have a greater general solubility than the alkaline earth metal compounds and the alkoxides and salts of dicyandiamide are more soluble than the oxides and hydroxides.

While the reaction may be carried out over a wide range of temperatures, it is generally advisable to employ a temperature within the range of about 100°–200° C. and still more preferable if the temperature employed is within the range of 100°–160° C. At temperatures substantially below 100° C. the reaction progresses too slowly to be of any practical advantage whereas at a temperature substantially in excess of 200° C. there is a greatly increased opportunity for the formation of by-products such as melamine, ammeline, ammelide and the like.

If desired, the alkali metal or alkaline earth metal salts of cyanomelamine may be obtained directly from the reaction mixture or if cyanomelamine is desired the reaction mixture may be acidified to provide the free cyanomelamine. If other alkali metal or alkaline earth metal salts are desired, the cyanomelamine may be dissolved in a solvent such as ethylene glycol, diethylene glycol, ethylene glycol monoethyl ether and the like, and treated with suitable base such as calcium metal, barium metal, barium hydroxide, sodium hydroxide, potassium hydroxide, lithium hydroxide and the like, the salt being obtained by crystallization.

The cyanomelamines of the present invention are valuable chemicals, being useful as intermediates in the production of a large number of compounds which are useful as chemotherapeutic agents, pharmaceuticals, fire proofing, textile agents, insecticides, rubber chemicals, plastics, resins and the like.

In the following examples are shown the various methods and conditions which may be employed in the preparation of such cyanomelamines in accordance with the process of the present invention.

Example 1

A solution of 25.0 grams of 85% KOH in 1125 ml. of ethylene glycol monoethyl ether was prepared and 240 grams of 94% sodium dicyanimide and 252 grams of dicyandiamide were added. The mixture was stirred and heated to reflux (130° C.) on an oil bath giving almost complete solution. Sodium cyanomelamine soon separated and after a short time stirring became difficult because of the thick mixture which developed. After continuing to reflux and stir for 2½ hours about 5 liters of water was added to effect solution of the sodium salt. The nearly colorless solution was treated with decolorizing charcoal and filter aid, filtered and the colorless filtrate acidified with acetic acid to precipitate finely divided, colorless, free cyanomelamine. After filtering and washing well with water, the cyanomelamine was dried in an oven. The yield of colorless, infusible product was 321 grams or 85% of theoretical. On purification of a small portion from a large volume of 25% ethylene glycol monoethyl ether and 75% water, fine colorless needles of cyanomelamine were obtained. The purified cyanomelamine was still infusible.

Example 2

A small piece of sodium metal was dissolved in 50 ml. of ethylene glycol monoethyl ether and 21.0 grams of potassium dicyanimide and 25.2 grams of dicyandiamide were added and the mixture heated to reflux whereupon almost complete solution was obtained. After 5 minutes, a large quantity of solid separated and the mixture was cooled, acetone was added and the solid was filtered. After drying, the potassium salt of cyanomelamine weighed 25.0 grams and was purified by solution in water and acidification with acetic acid to precipitate the free cyanomelamine.

Example 3

A mixture of 19.0 grams of sodium dicyanimide, 18.5 grams of dicyandiamide and 2.0 grams of 85% KOH was dissolved in 30 ml. of water by heating to reflux. After refluxing for 5 minutes, the solution was cooled, additional water added, and the solution was acidified with acetic acid. The precipitated cyanomelamine was filtered, washed with water and air dried.

Similar preparations were made using ethanol and ethylene glycol as solvents for the reaction.

Example 4

After dissolving 5.0 grams of 85% KOH in 225 ml. of ethylene glycol monomethyl ether, 48.0 grams of sodium dicyanimide and 50.4 grams of dicyandiamide were added and the stirred mixture refluxed for two and one-half hours at approximately 130° C. Water was added to the hot slurry and after solution resulted, extraneous matter was removed by filtration, and the colorless filtrate was acidified with acetic acid to precipate the free cyanomelamine. The product was filtered, washed with water, and after drying amounted to 65.5 grams (87% of theoretical).

These examples are illustrative of the methods by which a cyanomelamine may be prepared, but it is to be understood that the invention is not to be limited thereby but is to be construed broadly and restricted solely by the scope of the appended claims.

What is claimed is:

1. A process for preparing a cyanomelamine of the formula

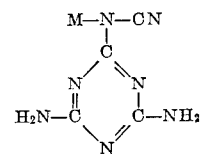

where M is a member of the group consisting of hydrogen, alkali metal, and alkaline earth metal ions comprising reacting a dicyanimide with a dicyandiamide under strongly basic conditions in a water-miscible, hydroxylated solvent.

2. A process for preparing a cyanomelamine of the formula

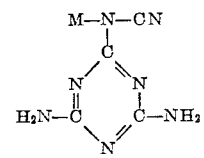

where M is a member of the group consisting of hydrogen, alkali metal, and alkaline earth metal ions comprising reacting a dicyanimide with a dicyandiamide under strongly basic conditions in a water-miscible, hydroxylated solvent at a temperature within the range of about 100°–200° C.

3. A process for preparing a cyanomelamine of the formula

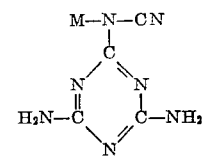

where M is a member of the group consisting of hydrogen, alkali metal, and alkaline earth metal ions comprising reacting a dicyanimide with a dicyandiamide under strongly basic conditions in a water-miscible, hydroxylated solvent at a temperature within the range of about 100°–160° C.

4. A process for preparing a cyanomelamine of the formula

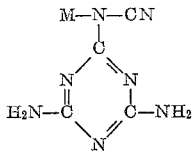

where M is a member of the group consisting of hydrogen, alkali metal, and alkaline earth metal ions comprising reacting a member of the group consisting of the alkali metal and alkaline earth metal dicyanimides with dicyandiamide in the presence of a base selected from the group consisting of the alkali metal and alkaline earth metal oxides, hydroxides and alkoxides in a water-miscible, hydroxylated solvent at a temperature within the range of about 100°–160° C.

5. The process of claim 4 employing 1 equivalent of the dicyanimide reactant, slightly in excess of 1 equivalent of dicyandiamide and about $\frac{1}{10}$ of an equivalent of the base.

6. A process for preparing a cyanomelamine of the formula

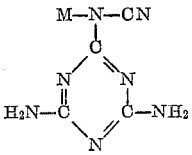

where M is a member of the group consisting of hydrogen, alkali metal, and alkaline earth metal ions comprising reacting an alkali metal dicyanimide with dicyandiamide in the presence of a base selected from the group consisting of the alkali metal and alkaline earth metal oxides, hydroxides and alkoxides in a water-miscible, hydroxylated solvent at a temperature within the range of about 100°–160° C.

7. The process of claim 6 employing 1 equivalent of the alkali metal dicyanimide, slightly in excess of 1 equivalent of the dicyandiamide and about $\frac{1}{10}$ of an equivalent of the base.

8. A process for preparing a cyanomelamine of the formula

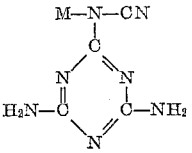

where M is a member of the group consisting of hydrogen, alkali metal, and alkaline earth metal ions comprising reacting calcium dicyanimide with dicyandiamide in the presence of an alkali metal alkoxide in a water-miscible, hydroxylated solvent at a temperature within the range of about 100°–160° C.

9. The process of claim 8 employing 1 equivalent of calcium dicyanimide, slightly in excess of 1 equivalent of the dicyandiamide and about $\frac{1}{10}$ of an equivalent of the alkoxide.

10. A process for preparing a cyanomelamine of the formula

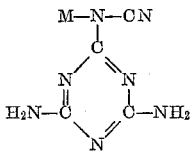

where M is a member of the group consisting of hydrogen, alkali metal, and alkaline earth metal ions comprising reacting a member selected from the group consisting of the alkali metal and alkaline earth metal dicyanimides with dicyandiamide and an alkali metal dicyandiamide in a water-miscible, hydroxylated solvent at a temperature within the range of about 100°–160° C.

11. The process of claim 10 employing 1 equivalent of the dicyanimide, slightly in excess of 1 equivalent of the dicyandiamide and about $\frac{1}{10}$ of an equivalent of the alkali metal dicyandiamide.

12. A cyanomelamine of the formula

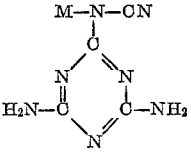

where M is a member of the group consisting of hydrogen, alkali metal and alkaline earth metal ions.

13. The product of claim 12 in which M is hydrogen.

14. The product of claim 12 in which M is an alkali metal.

15. The product of claim 12 in which M is an alkaline earth metal.

DONALD W. KAISER.
BRYAN C. REDMON.

REFERENCES CITED

The following references are of record in the file of this patent:

UNITED STATES PATENTS

| Number | Name | Date |
|---|---|---|
| 2,309,661 | Nagy | Feb. 2, 1943 |
| 2,309,679 | Thurston | Feb. 2, 1943 |
| 2,423,071 | Thurston | June 24, 1947 |

OTHER REFERENCES

Annalen de Chemie, 427, p. 26–34.
J. American Chem. Soc., 47 (1925), p. 1485–1490.
Compte Rendue, vol. 203, p. 568–570 (1936).
Banks: J. American Chemical Soc., Oct. 1944, vol. 61, pp. 1771–1778.